United States Patent [19]
Linari et al.

[11] Patent Number: 5,310,124
[45] Date of Patent: May 10, 1994

[54] WIRE TENSIONER WITH PROGRAM CONTROLLED BIDIRECTIONAL PULLEY WHEEL

[75] Inventors: Massimo Linari; Massimo Lombardi, both of Florence, Italy

[73] Assignee: Axis USA, Inc., Marlborough, Mass.

[21] Appl. No.: 875,389

[22] Filed: Apr. 29, 1992

[51] Int. Cl.$^5$ ............................................. B65H 59/38
[52] U.S. Cl. ........................... 242/7.05 B; 242/7.03; 242/1.1 R; 242/45; 318/6
[58] Field of Search ................. 242/7.05 B, 7.03, 7.11, 242/7.13, 1.1 R, 45, 7.05 R, 25 R, 75.3; 226/112; 318/6

[56] References Cited

U.S. PATENT DOCUMENTS

| | | | |
|---|---|---|---|
| 2,981,491 | 4/1961 | Evans, Jr. | 318/6 |
| 3,251,559 | 5/1966 | Moore . | |
| 3,682,410 | 8/1972 | Rinearson | 242/45 X |
| 4,062,502 | 12/1977 | Peck, Jr. . | |
| 4,381,852 | 5/1983 | Ferree et al. . | |
| 4,854,512 | 8/1989 | Montali et al. | 242/45 X |
| 4,880,173 | 11/1989 | Lachey . | |
| 4,899,945 | 2/1990 | Jones | 242/45 |
| 4,967,973 | 11/1990 | Murnane | 242/45 |
| 5,080,295 | 1/1992 | Hongo et al. . | |
| 5,092,532 | 3/1992 | Meroni et al. . | |

FOREIGN PATENT DOCUMENTS

| | | |
|---|---|---|
| 884075 | 12/1961 | European Pat. Off. . |
| 0424770A2 | 5/1991 | European Pat. Off. . |
| 4019139A1 | 12/1991 | Fed. Rep. of Germany . |
| 4019140A1 | 12/1991 | Fed. Rep. of Germany . |
| 2137237A | 10/1984 | United Kingdom . |

*Primary Examiner*—Andrew M. Falik
*Attorney, Agent, or Firm*—Robert R. Jackson; G. Victor Treyz

[57] ABSTRACT

A wire tensioner maintains wire in a winding machine at a substantially constant tension during the process of winding coils for electrical components such as armatures. The tensioner has a pulley wheel that is driven by a bidirectional drive unit. During operation, the pulley wheel either feeds wire toward a workpiece or draws wire back, depending on the nature of the tension correction required.

55 Claims, 8 Drawing Sheets

WIRE TENSIONER WITH PROGRAM CONTROLLED BIDIRECTIONAL PULLEY WHEEL

BACKGROUND OF THE INVENTION

This invention relates to wire tensioners, and particularly to tensioners used to regulate wire tension during the process of winding coils for electrical components such as electric motor armatures and stators.

The process of manufacturing armatures, stators, and similar electric motor parts involves several wire winding steps, including coiling wire around a workpiece and forming connections to lead terminations such as the commutator of an armature. A typical armature winder, for example, dispenses wire from a flyer that rotates around a stationary armature. During the winding process, it is important to keep the tension of wire leaving the flyer fairly high in order to create a sufficiently compact and orderly coil about the armature and to ensure the correct attachment of the wire to various types of commutator connections. However, wire tension can vary sharply during winding due to accelerations and decelerations of the flyer, particularly between process steps, when the flyer changes its direction of rotation and when winding at high speeds. This can result in a wire break unless a wire tensioner is used to maintain the wire at a constant tension.

Typically, wire tensioners regulate tension using either a spring and pulley arrangement or a source of variable drag to apply tension to the wire being wound. With the spring arrangement, when wire tension rises, excess tension is absorbed by stretching the spring. When tension drops, pressure from the spring or additional drag from the variable drag element maintains the wire sufficiently taut.

The performance of winding machines is enhanced by the incorporation of wire tensioners, as a more stable wire tension allows machines to be operated at higher speeds without risking wire breaks due to tension transients. Nevertheless, the degree of tension control supplied by previously known wire tensioners has generally not been sufficient for all winding applications. It would thus be desirable to be able to provide an improved wire tensioner that is capable of generating faster and stronger corrective tensions than previously possible so that winding machine performance may be increased.

SUMMARY OF THE INVENTION

It is therefore an object of the present invention to be able to provide a wire tensioner for regulating the tension of wire in a winder during the winding process.

It is a further object of the invention to be able to provide a wire tensioner for maintaining wire in a winding machine at a substantially constant tension during the process of winding coils for electrical components such as electric motor armatures and stators.

It is another object of the invention to be able to provide a wire tensioner for maintaining wire at a substantially constant tension in a machine that winds wire around a workpiece, the wire tensioner receiving wire from a source and having a pulley wheel that engages and accepts the wire and having a drive unit that is connected to the pulley for rotating the wheel in a first direction such that wire is fed toward the workpiece and a second direction such that wire is drawn back from the workpiece, the drive unit receiving and being responsive to drive signals that control the torque applied by the drive unit.

The present invention provides a wire tensioner for use with a winding machine having a pulley wheel that is driven by a bidirectional drive unit. During periods of steady winding, the pulley wheel is rotated at a substantially fixed velocity such that wire in contact with the pulley is fed in a direction toward the workpiece, thereby providing correctly tensioned wire to the flyer. When appropriate due to motion of the flyer, the pulley may be counter-rotated to take up unwanted slack in the wire, thereby keeping the wire tension at the desired level.

The sequence of pulley wheel rotations required to maintain wire tension constant depends on the wire used as well as the nature of the workpiece. For a given type of wire and workpiece, the corrective rotations needed to ensure substantially constant wire tension throughout the wire winding process may be determined by calibrating test runs in which the wire tension is measured. A control unit may then be used to provide the pulley wheel drive motor with the necessary drive signals for counteracting anticipated variations in wire tension. Any remaining wire tension fluctuations may be handled in real-time by continually monitoring the tension and providing corresponding feedback signals to the control unit and a main controller. With a wire tensioner in accordance with the present invention it is possible to wind aluminum alloy wire, which is generally more difficult to handle than conventional copper wire because it is less elastic.

Further features of the invention, its nature and various advantages will be more apparent from the following detailed description of the preferred embodiments and the accompanying drawings.

DETAILED DESCRIPTION OF THE PREFERRED EMBODIMENTS

Figure 1:
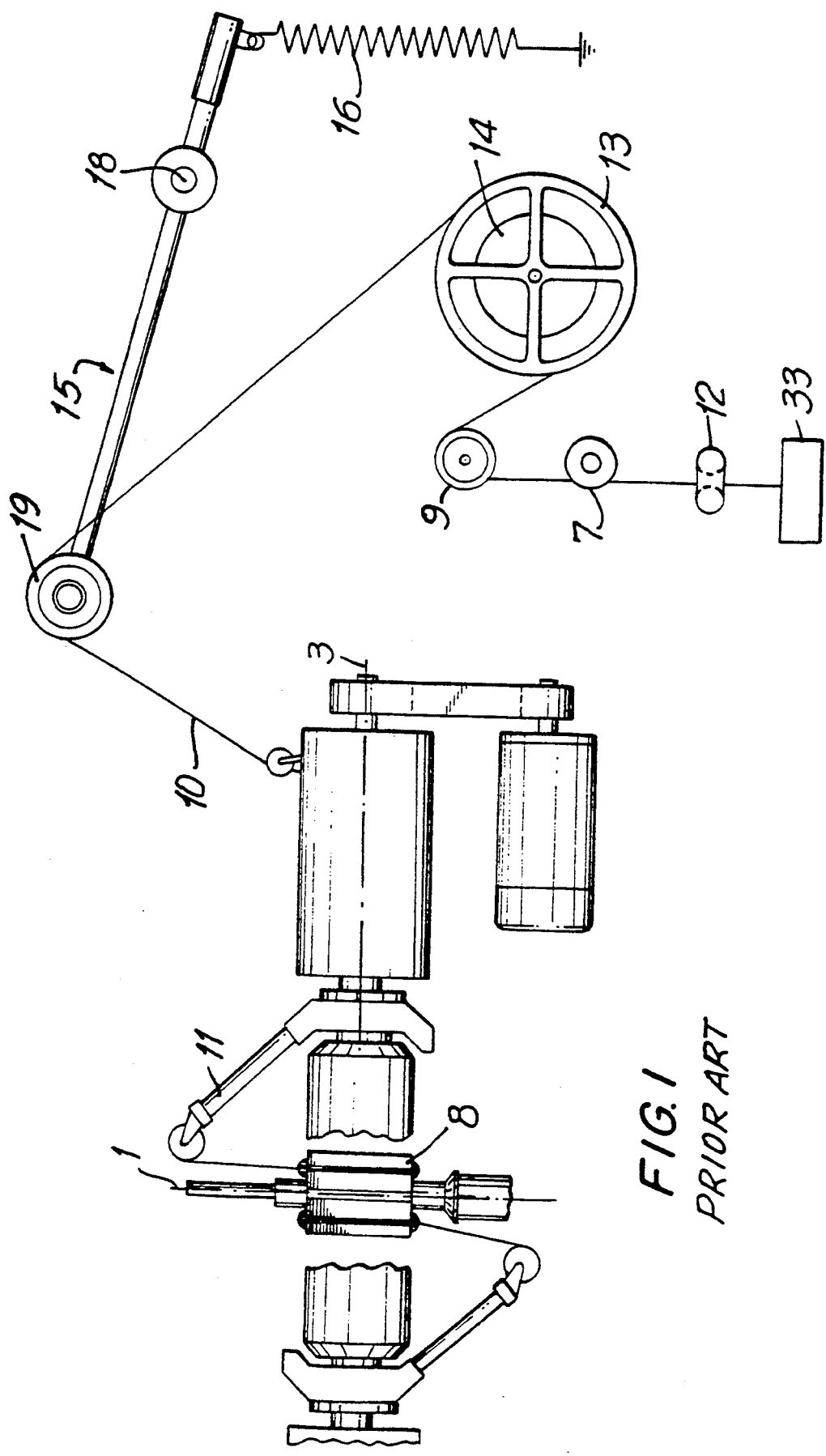
FIG. 1 is a schematic diagram of a conventional wire tensioner that feeds wire to a flyer of an armature winder.
Figure 2:
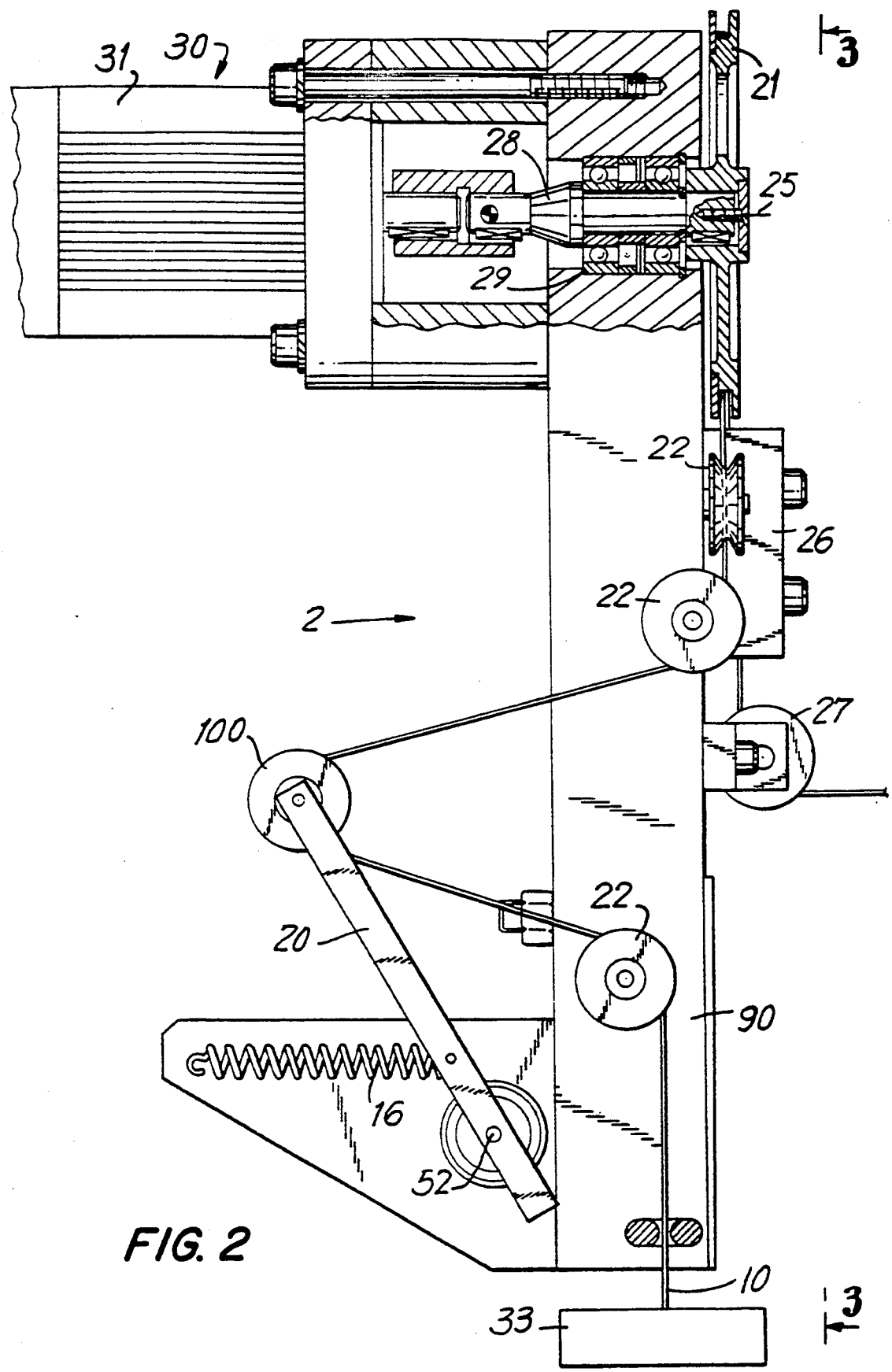
FIG. 2 is a view, partially in section, of an illustrative embodiment of a wire tensioner constructed according to this invention.
Figure 3:
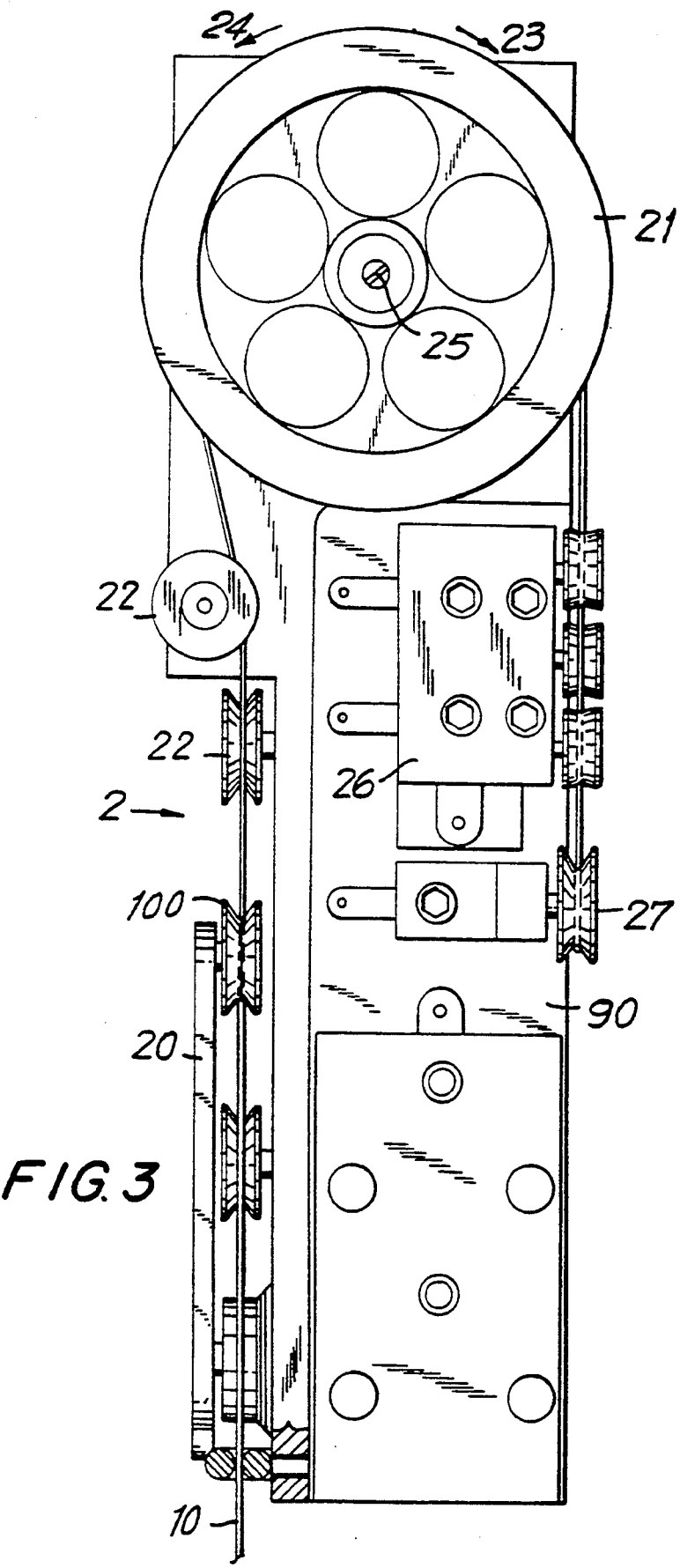
FIG. 3 is a view taken along line 3—3 in FIG. 2.

Winding machines are often provided with tensioners to stabilize wire tension during the wire winding process. Wire tensioning devices allow coils to be wrapped tightly around a workpiece, while preventing excessive wire tension from developing and causing a wire break. As shown in FIG. 1, a typical arrangement for winding coils on an electric motor armature 8 uses ring 12 to guide wire 10 from wire supply 33 onto pulley wheel 13 via guide pulleys 7 and 9. Brake 14 provides a retarding tension as wire 10 is passed to flyer 11 via idle pulley 19.

In operation, workpiece 8 is wound with wire 10 as flyer 11 rotates around axis 3. Workpiece 8 may be incrementally rotated around axis 1 so that all slots can be wound. Idle pulley 19 is attached to the end of dancer arm 15, which is pivoted at hinge 18. Idle pulley 19 is biased against wire 10 by spring 16, which is attached to the end of dancer arm 15. The bias provided by idle pulley 19 maintains wire 10 at an essentially constant tension. For example, when the tension in wire 10 starts to rise, idle pulley 19 is drawn downward, relieving tension rather than allowing wire 10 to break. Similarly, instead of permitting slack to develop in wire 10, idle pulley 19 pulls wire 10 upward when the wire tension starts to fall. Although moderate fluctuations in the tension of wire 10 may be suitably dampened in this way, in practice the arrangement shown in FIG. 1 is not capable of reacting to all tension variations with sufficient agility or force. Further, tensioners of this type are typically designed to handle only a restricted range of wire sizes.

In the wire tensioner of the present invention, a programmably controlled bidirectional rotating pulley wheel provides improved tension control and accommodates various gauges of wire. Referring to FIGS. 2-5, wire tensioner 2 accepts wire 10 from wire supply 33. Wire 10 is routed to pulley wheel 21 via idle wheels 22 and pulley 100, which is attached to dancer arm 20. Dancer arm 20, which is mounted on frame 90 with hinge 52, is biased by spring 16. Pulley 100 pretensions and holds wire 10 against pulley wheel 21 to prevent slipping. Wire 10 passes from pulley wheel 21 through tension sensor 26. From tension sensor 26, wire 10 is directed to flyer 11 by means of idle wheel 27.

Pulley wheel 21 is rigidly connected to shaft 28, which is supported on bearings 29 so that pulley wheel 21 may be rotated around axis 25 by drive unit 30. Drive unit 30, which is connected to shaft 28, is capable of rotating pulley wheel 21 in either direction 23 or 24. Wire 10 is fed to flyer 11 and workpiece 8 when pulley wheel 21 rotates in direction 23 and is drawn back from flyer 11 and workpiece 8 when pulley wheel 21 rotates in direction 24. Drive unit 30 is preferably capable of applying variable torques in either direction 23 or 24 and can rotate pulley wheel 21 at various selected speeds.

Figure 4:
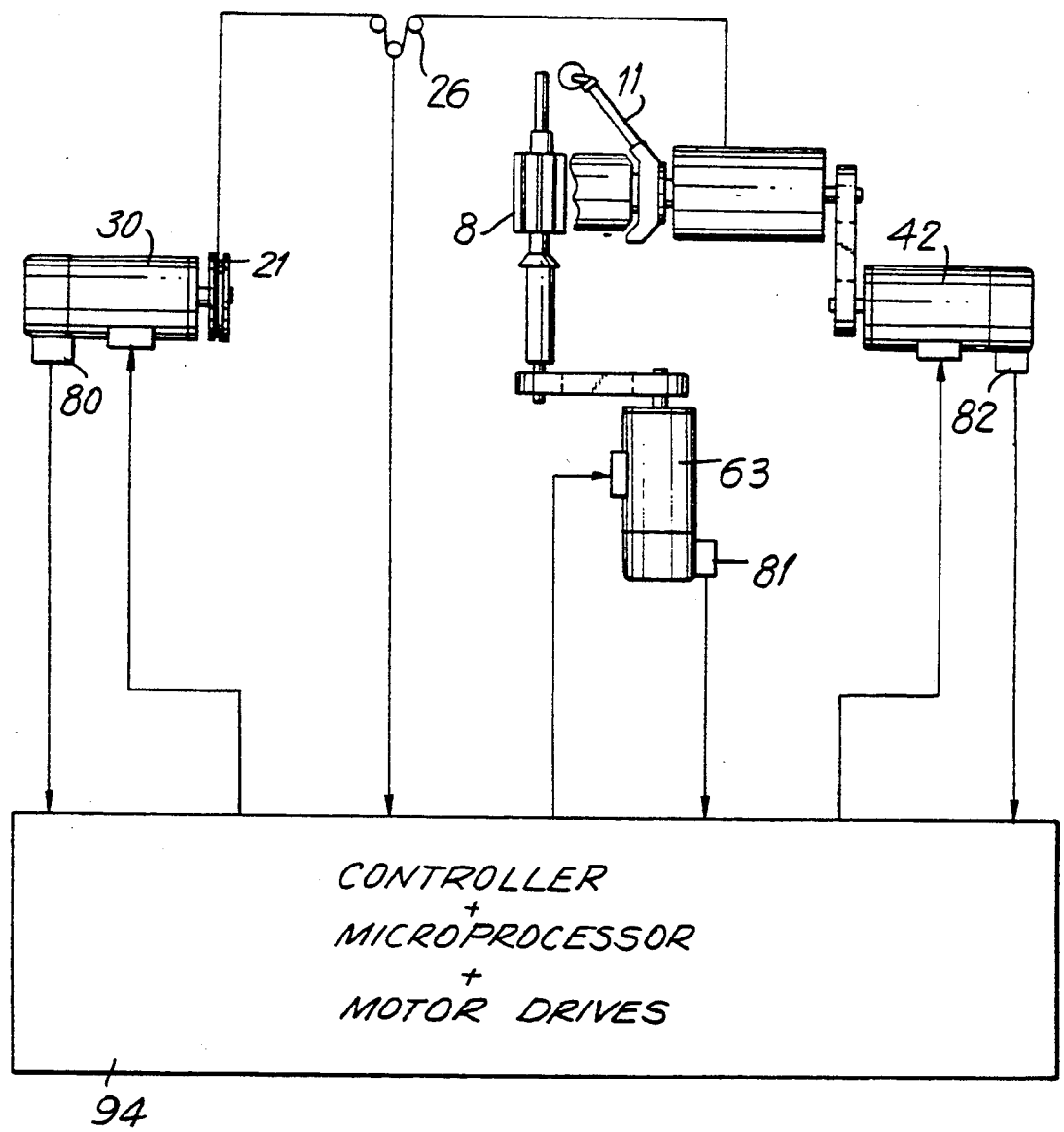
FIG. 4 is a schematic diagram of an illustrative winding machine system environment of the wire tensioner according to the invention.

Typically, the motion of flyer 11 is precisely controlled according to preset time schedules. The schedules contain the intended positions and velocities flyer 11 is to obtain during operation. For instance, flyer 11 may be scheduled to reverse its rotational direction for specific winding machine operations such as when connecting leads to commutators. An illustrative wire tensioner system for a winding machine in accordance with the present invention is shown in FIG. 4. The motion of flyer 11 may be synchronized with the motion of workpiece 8 to wind multiple slots of workpiece 8. To maintain an acceptably constant tension in wire 10, pulley wheel 21 may be rotated by drive unit 30 in anticipation of the expected motions of workpiece 8 and flyer 11, which are driven by support motor 63 and flyer motor 42, respectively. Position information from resolvers 80, 81, and 82 may be used by controller means 94 to continually or periodically update the sequence of drive signals (schedule) so that tension variations measured by tension sensor 26 may be held to a minimum.

Figure 5:
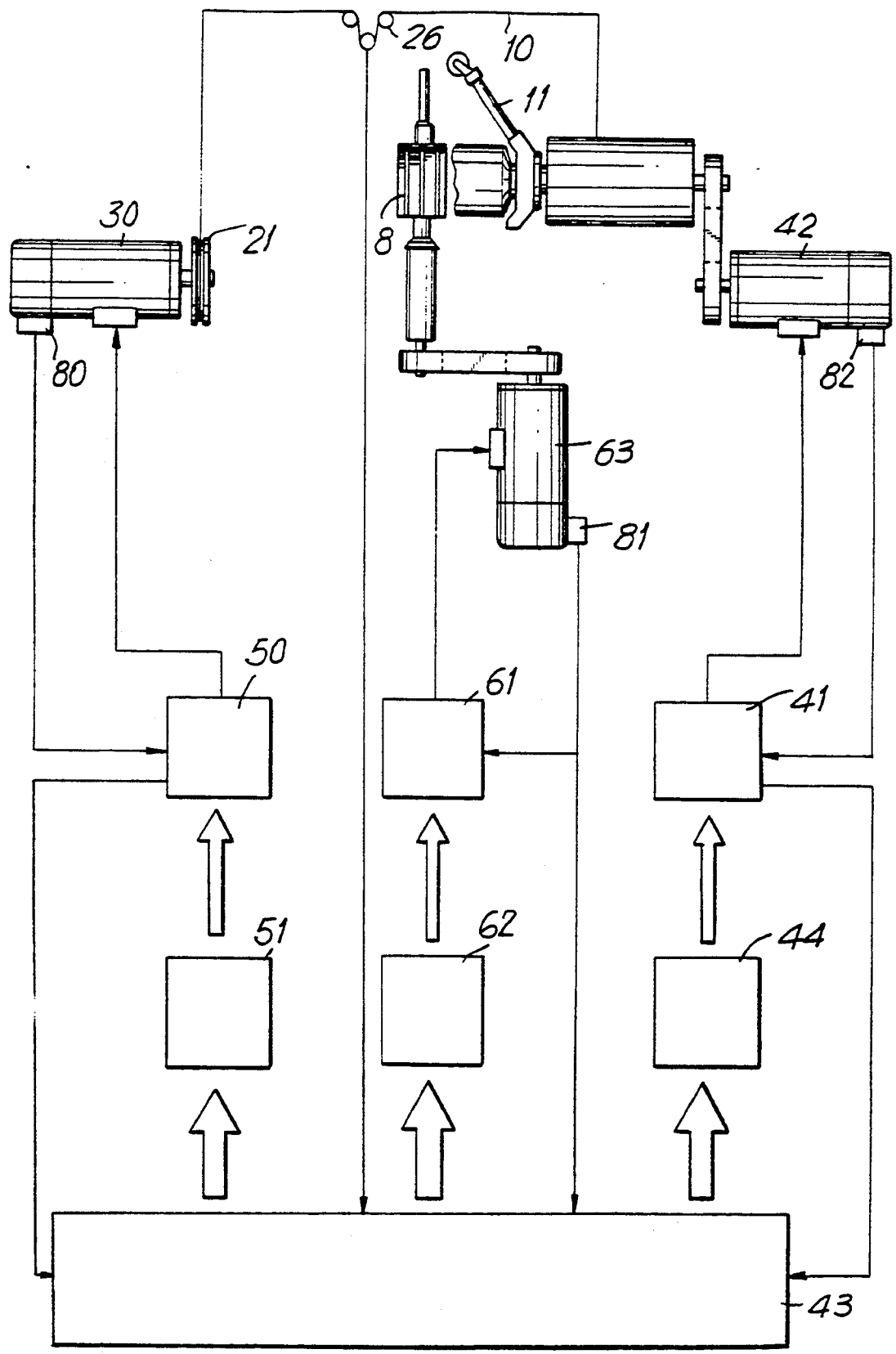
FIG. 5 is a schematic diagram of the illustrative winding system environment of FIG. 4 further showing illustrative control and servoamplifier units in accordance with the invention.

Referring to FIG. 5, which shows a more detailed illustrative embodiment of the winding machine environment, the position of flyer 11 is controlled by sequential commands that are supplied to position control card 44 by main controller 43. According to a previously defined schedule, position control card 44 supplies reference signals to servoamplifier unit 41, which supplies corresponding drive signals to flyer motor 42, which in turn drives flyer 11. The position of flyer motor 42 is provided to servoamplifier unit 41 by resolver 82 mounted at flyer motor 42. From this position signal, the speed of flyer motor 42 may be determined by servoamplifier unit 41 and fed back to main controller 43.

A similar arrangement may be used to control the orientation of workpiece 8. Servoamplifier unit 61, position control card 62 and support motor 63 can be used by main controller 43 to index the armature for positioning the core slots in relation to guides for aligning the wire with the core slots and for positioning tangs or slots of the commutator for lead connection. Position information from support motor 63 is provided by resolver 81. If flyer 11 is stationary during indexing, wire 10 is drawn from wire supply 33 by the rotation of workpiece 8.

The motion of pulley wheel 21 is controlled by servoamplifier unit 50, which supplies drive signals to drive unit 30 in response to analog reference signals received from control unit 51. The drive signals control the direction and magnitude of the torque or speed applied by drive unit 30 to pulley wheel 21. Main controller 43 supplies command signals to control unit 51 that are synchronized in time with the sequential commands supplied to flyer 11 via position control card 44 and servoamplifier unit 41 and commands supplied to support motor 63 via position control card 62 and servoamplifier unit 61 for indexing the armature.

Additionally, closed feedback may be obtained using resolver 80 connected to drive unit 30 for supplying analog position signals to servoamplifier unit 50 during operation. Further, tension sensor 26 on the wire leading to flyer 11 may be used for determining the actual tension of wire 10 during winding. Tension feedback signals from tension sensor 26 which correspond to the measured tension may be used by main controller 43 to obtain closed loop control, particularly during closed loop speed or torque control of pulley 21.

For optimum position control drive unit 30, support motor 63, and motor 42 are low-inertia brushless motors which employ resolvers 80, 81, and 82 to provide analog position signals to servoamplifier units 50, 61, and 41 respectively. The servoamplifier units can be used to differentiate these signals to provide speed information to main controller 43, and thus provide closed loop speed control of the motors. Additionally, feedback signals may be provided that are proportional to motor torque. Support motor 63 is driven in response to support motor control signals from main controller 43 and flyer motor 42 is driven in response to flyer control signals from main controller 43. In general there are three types of control modes for the brushless motors. In a first mode the motor is maintained at a predetermined torque, in a second mode the motor is maintained at a predetermined speed, and in a third mode, the motor position is controlled. Further, closed loop speed control of the motors by the servoamplifier units may be required during simultaneous closed loop position control of the motors or during closed loop torque control of the pulley wheel motor in order to prevent undesirable oscillation of the winding system motors. Closed loop speed control thus allows wire 10 to be wound smoothly.

Figure 6:
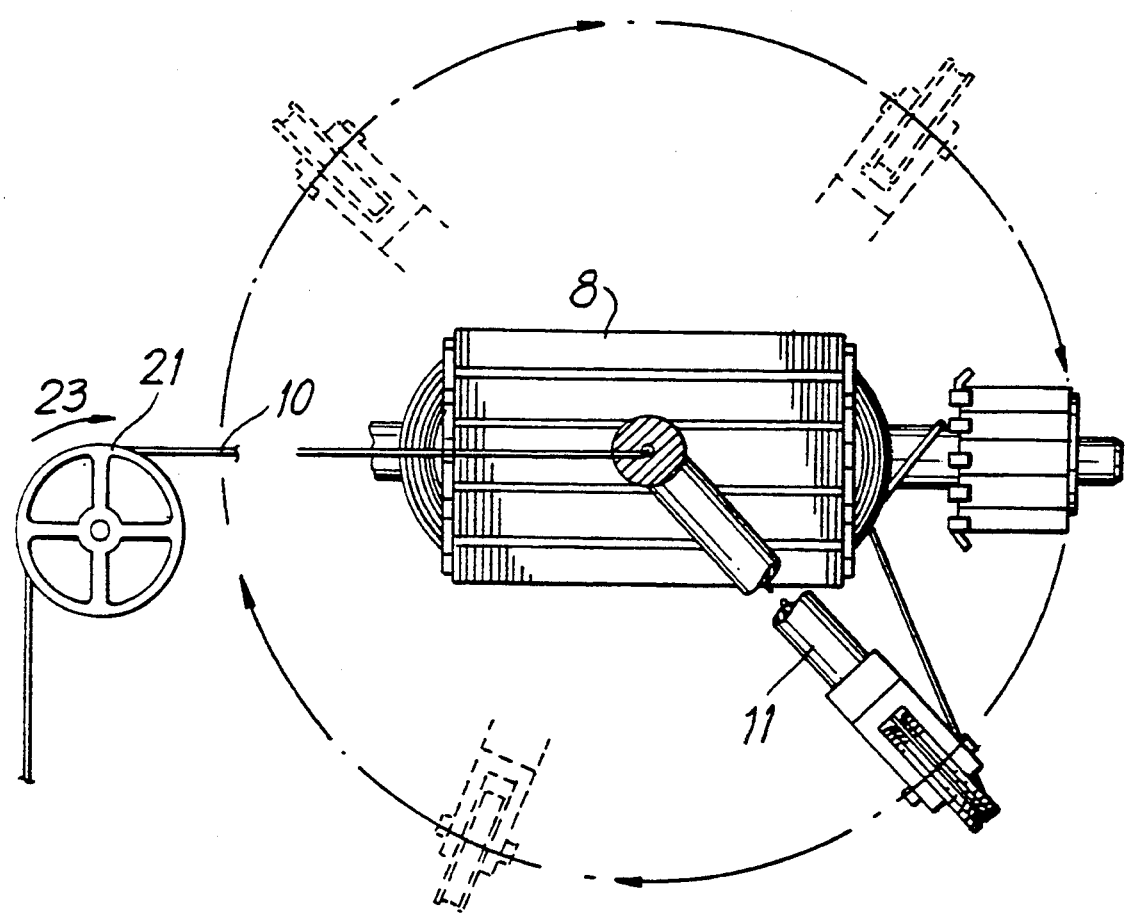
FIG. 6 is a schematic diagram showing the pulley wheel of FIG. 2 as it provides wire to a flyer that is coiling wire around an armature, according to the invention.
Figure 7:
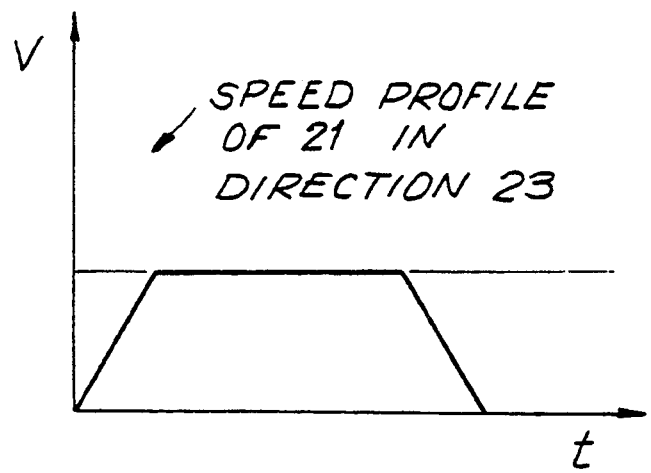
FIG. 7 is an illustrative velocity profile of the pulley wheel during the coiling operation shown in FIG. 6.

Given a schedule of flyer position and speed, the required motion of pulley wheel 21 may be accurately determined. Thus, when it is anticipated that flyer 11 will accelerate in order to reach a desired winding speed or to reach a predetermined position, pulley wheel 21 should be accelerated in direction 23 to avoid increasing the tension of wire 10. When flyer 11 will soon decelerate after winding and reach a lower speed or stop rotating, the speed of rotation of pulley wheel 21 in direction 23 should be decreased. When, as shown in FIGS. 6 and 7, flyer 11 rotates at constant speed, as occurs during winding of wire 10 in core slots, pulley wheel 21 is urged by wire 10 in direction 23. In this case drive unit 30 should apply a constant drag torque to wire 10 via pulley wheel 21, in order to maintain a suitable tension for winding. Alternatively, pulley wheel 21 may be rotated at a constant speed that provides wire 10 at a rate that is slightly slower than the speed at which wire 10 is drawn by flyer 11, thus providing a constant tension during winding.

Figure 9:
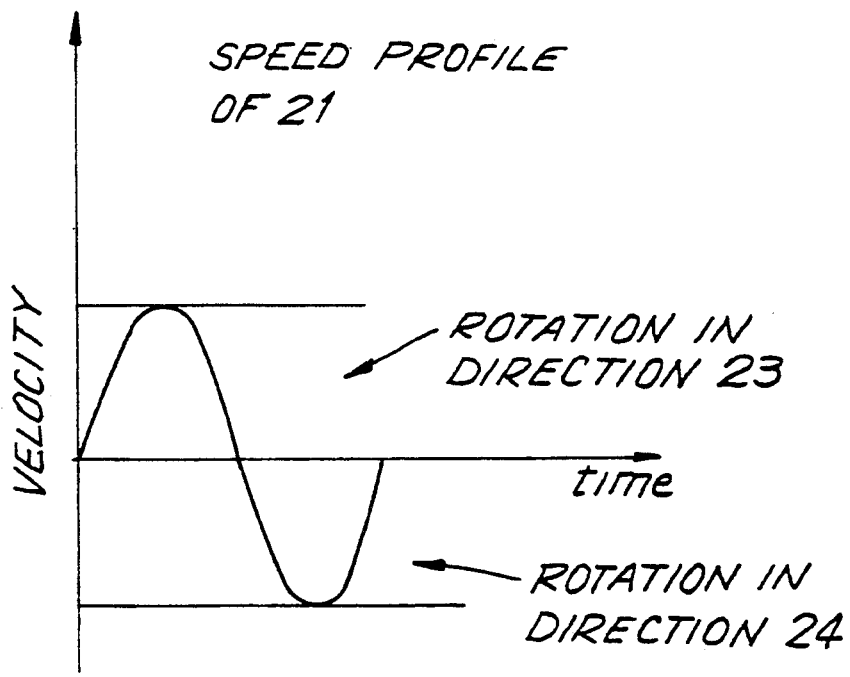
FIG. 9 is a velocity profile of the pulley wheel during the operation shown in FIG. 8.
Figure 8:
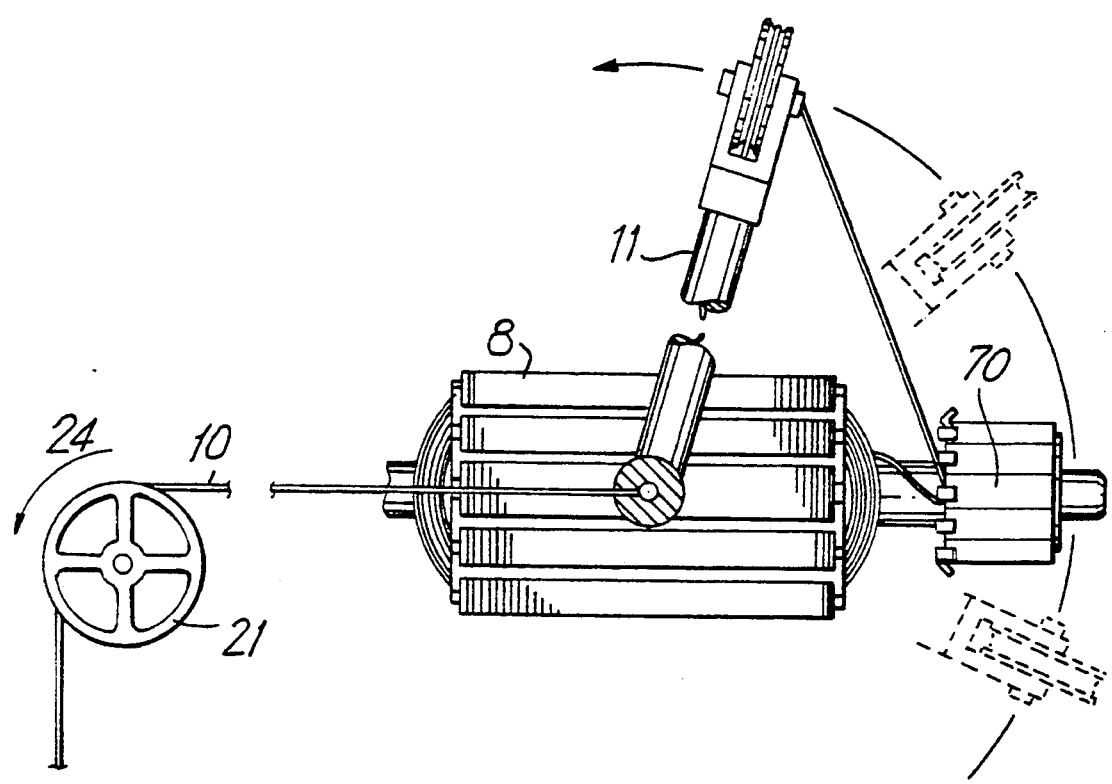
FIG. 8 is a schematic diagram showing the pulley wheel of FIG. 2 as it takes up slack wire during the operation of attaching wire to a commutator, according to the invention.

A more complex response is shown in FIGS. 8 and 9. During lead connection to commutator 10, flyer 11 may change rotation from one direction to another abruptly. To avoid an unwanted decrease in the tension of wire 10, pulley wheel 21 should be rotated in direction 24 to recover wire from flyer 11. This wire is maintained under tension by dancer arm 20. For accurate tension control, drive unit 30 and all parts which rotate during the movement of wire 10 must have low inertia. Drive unit 30 is therefore preferably a low-inertia brushless motor.

For a given set of winding parameters such as armature size, wire gauge, slot fill to be achieved and winding speed to be reached, either test results from trial runs or calculations may be used to determine the required winding command signals in advance. The resulting schedules for motor 31 may be updated either continuously or periodically based on the deviations of the measured tension obtained from tension sensor 26 during production winding from the required values. When a winder having wire tensioner 2 has been fully programmed, the only information that an operator must supply is the armature type and the wire size. Thus, by using the winding system configuration of FIGS. 4 and 5, the feedback signals from various active components may be monitored, and the relative timing of the winding, indexing and pretensioning steps precisely determined. Components may then be driven in anticipation of expected wire tension variations according to the predetermined schedule. Further, control algorithms which take predicted wire tensions into account may be developed and programmed into main controller 43 or control means 94.

One schedule that may be developed is a speed schedule for providing closed-loop control of pulley wheel 21. (The first of these schedules may be obtained on the basis of trial runs.) As noted above, the tension of wire 10 may be controlled by rotating pulley wheel 21 at preselected speeds that are synchronized with the expected motions of flyer 11. The schedules may be corrected (updated) during closed loop speed control either continuously or periodically by using tension sensor 26 for feedback. Synchronization of the motion of pulley wheel 21 and flyer 11 is accomplished by the simultaneous control by main controller 43 (control means 94). If the timing of the motion of flyer 11 were to change relative to a previously determined schedule, the schedule for the motion of pulley wheel 21 should be updated.

Occasionally it may be necessary to correct the schedule due to a timing offset that has developed between these components. In this case the relative timing between flyer 11 and pulley wheel 21 may be corrected by simply incorporating the offset into an updated schedule.

It will be apparent that the foregoing is merely illustrative of the principles of this invention, and that various modifications can be made by those skilled in the art without departing from the scope and spirit of the invention. For example, the wire tensioner of the present invention may be used with winding machines that wind workpieces other than armature and stators.

What is claimed is:

1. A wire tensioner for maintaining wire at a substantially constant tension in a machine that winds wire around a workpiece, comprising:
   a frame;
   means mounted on the frame for receiving the wire from a wire supply;
   a pulley wheel that engages the wire and accepts the wire from the means for receiving; and
   a drive unit mounted on the frame and connected to the pulley wheel for rotating the pulley wheel in a first direction such that wire is fed toward the workpiece, the wire between the pulley wheel and the workpiece accordingly having a lower tension than the wire between the pulley wheel and the workpiece would otherwise have, and a second direction such that wire is drawn back from the workpiece, the wire between the pulley wheel and the workpiece accordingly having a higher tension than the wire between the pulley wheel and the workpiece would otherwise have, the drive unit receiving and being responsive to drive signals that control torques applied by the drive unit.

2. The wire tensioner of claim 1 further comprising a tension sensor mounted on the frame and in contact with the wire for measuring the tension of the wire and for providing corresponding tension feedback signals.

3. The wire tensioner of claim 2 wherein the tension sensor is mounted to the frame at a point which allows the tension sensor to contact the wire that is between the pulley wheel and the workpiece.

4. The wire tensioner of claim 1 wherein the drive unit is connected to the pulley wheel by a shaft that is rotatably mounted on bearings that are supported within the frame.

5. The wire tensioner of claim 1 wherein the drive unit is a low inertia brushless motor.

6. The wire tensioner of claim 1 further comprising:
   a main controller;

a flyer for dispensing the wire during winding; and a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

7. The wire tensioner of claim 6 further comprising:

a support motor for rotating the workpiece in response to support motor control signals from the main controller, such that the motions of the drive unit, the flyer motor, and the support motor may be synchronized according to schedules provided by the main controller.

8. A wire tensioner for maintaining wire at a substantially constant tension in a machine that winds wire around a workpiece, comprising:

a frame;

means mounted on the frame for receiving the wire from a wire supply;

a pulley wheel that engages the wire and accepts the wire from the means for receiving; and a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals that control torques applied by the drive unit, wherein the means for receiving comprises a dancer arm assembly for pretensioning the wire.

9. The wire tensioner of claim 8 wherein the dancer arm assembly comprises:

a dancer arm pivotably attached to the frame;

a dancer arm pulley attached to the dancer arm for engaging the wire; and a spring attached between the frame and the dancer arm for biasing the dancer arm such that the dancer arm pulley pretensions the wire.

10. The wire tensioner of claim 9 wherein the means for receiving further comprises at least one idle wheel rotatably mounted on the frame for guiding the wire between the wire supply, the dancer arm pulley and the pulley wheel.

11. The wire tensioner of claim 1 further comprising:

a main controller;

a flyer for dispensing the wire during winding; and a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

12. The wire tensioner of claim 11 further comprising:

a support motor for rotating the workpiece in response to support motor control signals from the main controller, such that the motions of the drive unit, the flyer motor, and the support motor may be synchronized according to schedules provided by the main controller.

13. A wire tensioner for maintaining wire at a substantially constant tension in a machine that winds wire around a workpiece, comprising:

a frame;

means mounted on the frame for receiving the wire from a wire supply;

a pulley wheel that engages the wire and accepts the wire from the means for receiving; and a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals that control torques applied by the drive unit, the wire tensioner further comprising a tension sensor mounted on the frame and in contact with the wire for measuring the tension of the wire and for providing corresponding tension feedback signals, the drive unit further comprising a resolver for supplying position signals.

14. The wire tensioner of claim 13 further comprising:

a main controller for receiving the tension feedback signals and servoamplifier unit feedback signals and for providing command signals; and control means for receiving the position signals and the command signals and for providing the drive signals to the drive unit.

15. The wire tensioner of claim 14 wherein the control means comprises:

a control unit for receiving the command signals and for providing corresponding analog reference signals; and a servoamplifier unit for receiving the position signals and the analog reference signals and for providing the drive signals accordingly.

16. The wire tensioner of claim 14 further comprising:

a flyer motor for driving a flyer for dispensing the wire during winding that is responsive to flyer control signals that are received from the main controller; and a support motor for rotating the workpiece in response to support motor control signals from the main controller, such that the motions of the drive unit, the flyer motor, and the support motor may be synchronized according to schedules provided by the main controller.

17. The wire tensioner of claim 13 further comprising:

a main controller;

a flyer for dispensing the wire during winding; and a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

18. The wire tensioner of claim 17 further comprising:

a support motor for rotating the workpiece in response to support motor control signals from the main controller, such that the motions of the drive unit, the flyer motor, and the support motor may be synchronized according to schedules provided by the main controller.

19. A wire tensioner for maintaining wire at a substantially constant tension in a machine that winds wire around a workpiece, comprising:

a frame;

means mounted on the frame for receiving the wire from a wire supply;

a pulley wheel that engages the wire and accepts the wire from the means for receiving;

a drive unit mounted on the frame and connected to the pulley wheel for rotating the pulley wheel in a first direction such that wire is fed toward the workpiece, wire between the pulley wheel and the workpiece accordingly having a lower tension than the wire between the pulley wheel and the workpiece would otherwise have, and a second direction such that wire is drawn back from the workpiece, the wire between the pulley wheel and the workpiece accordingly having a higher tension than the wire between the pulley wheel and the workpiece would otherwise have, the drive unit receiving and being responsive to drive signals provided by a main controller that control torques applied by the drive unit; and a tension sensor mounted on the frame and in contact with the wire for measuring the tension of the wire and for providing corresponding tension feedback signals to the main controller.

20. The wire tensioner of claim 19 wherein the tension sensor is mounted to the frame at a point which allows the tension sensor to contact the wire that is between the pulley wheel and the workpiece.

21. The wire tensioner of claim 19 further comprising:
   a flyer for dispensing the wire during winding; and
   a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

22. The wire tensioner of claim 21 further comprising:
   a support motor for rotating the workpiece in response to support motor control signals from the main controller, such that the motions of the drive unit, the flyer motor, and the support motor may be synchronized according to schedules provided by the main controller.

23. A wire tensioner for maintaining wire at a substantially constant tension in a machine that winds wire around a workpiece, comprising:
   a frame;
   means mounted on the frame for receiving the wire from a wire supply;
   a pulley wheel that engages the wire and accepts the wire from the means for receiving;
   a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals provided by a main controller that control torques applied by the drive unit; and
   a tension sensor mounted on the frame and in contact with the wire for measuring the tension of the wire between the pulley wheel and the workpiece and for providing corresponding tension feedback signals to the main controller, wherein the means for receiving comprises a dancer arm assembly for pretensioning the wire.

24. The wire tensioner of claim 23 further comprising a resolver within the drive unit for supplying position signals.

25. The wire tensioner of claim 24 further comprising control means for receiving the position signals and for receiving command signals from the main controller, the control means providing drive signals to the drive unit.

26. The wire tensioner of claim 25 wherein the control means comprises:
   a control unit for receiving the command signals and for providing corresponding analog reference signals; and
   a servoamplifier unit for receiving the position signals and the analog reference signals and for providing the drive signals accordingly.

27. The wire tensioner of claim 23 further comprising:
   a flyer for dispensing the wire during winding; and
   a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

28. The wire tensioner of claim 27 further comprising:
   a support motor for rotating the workpiece in response to support motor control signals from the main controller, such that the motions of the drive unit, the flyer motor, and the support motor may be synchronized according to schedules provided by the main controller.

29. A wire tensioner for maintaining wire at a substantially constant tension in a machine that winds wire around a workpiece, comprising:
   a frame;
   means mounted on the frame for receiving the wire from a wire supply;
   a pulley wheel that engages the wire and accepts the wire from the means for receiving;
   a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals provided by a main controller that control torques applied by the drive unit; and
   a tension sensor mounted on the frame and in contact with the wire for measuring the tension of the wire and for providing corresponding tension feedback signals to the main controller, wherein the dancer arm assembly comprises:
   a dancer arm pivotably attached to the frame;
   a dancer arm pulley attached to the dancer arm for engaging the wire; and
   a spring attached between the frame and the dancer arm for biasing the dancer arm such that the dancer arm pulley pretensions the wire.

30. The wire tensioner of claim 29 further comprising:
   a flyer for dispensing the wire during winding; and
   a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

31. The wire tensioner of claim 30 further comprising:
a support motor for rotating the workpiece in response to support motor control signals from the main controller, such that the motions of the drive unit, the flyer motor, and the support motor may be synchronized according to schedules provided by the main controller.

32. A wire tensioner for maintaining wire at a substantially constant tension in a machine that winds wire around a workpiece, comprising:
a frame;
means mounted on the frame for receiving the wire from a wire supply;
a pulley wheel that engages the wire and accepts the wire from the means for receiving;
a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals provided by a main controller that control torques applied by the drive unit; and
a tension sensor mounted on the frame and in contact with the wire for measuring the tension of the wire and for providing corresponding tension feedback signals to the main controller, wherein the drive unit is connected to the pulley wheel by a shaft that is rotatably mounted on bearings that are supported within the frame.

33. The wire tensioner of claim 32 further comprising:
a flyer for dispensing the wire during winding; and
a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

34. The wire tensioner of claim 33 further comprising:
a support motor for rotating the workpiece in response to support motor control signals from the main controller, such that the motions of the drive unit, the flyer motor, and the support motor may be synchronized according to schedules provided by the main controller.

35. A wire tensioner for maintaining wire at a substantially constant tension in a machine that winds wire around a workpiece, comprising:
a frame;
means mounted on the frame for receiving the wire from a wire supply;
a pulley wheel that engages the wire and accepts the wire from the means for receiving;
a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals provided by a main controller that control torques applied by the drive unit; and
a tension sensor mounted on the frame and in contact with the wire for measuring the tension of the wire and for providing corresponding tension feedback signals to the main controller, wherein the drive unit is a brushless motor.

36. The wire tensioner of claim 35 further comprising:
a flyer for dispensing the wire during winding; and
a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

37. The wire tensioner of claim 36 further comprising:
a support motor for rotating the workpiece in response to support motor control signals from the main controller, such that the motions of the drive unit, the flyer motor, and the support motor may be synchronized according to schedules provided by the main controller.

38. A wire tensioner for maintaining wire at a substantially constant tension in a machine that winds wire around a workpiece, comprising:
a frame;
means mounted on the frame for receiving the wire from a wire supply;
a pulley wheel that engages the wire and accepts the wire from the means for receiving;
a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals provided by a main controller that control torques applied by the drive unit; and
a tension sensor mounted on the frame and in contact with the wire for measuring the tension of the wire and for providing corresponding tension feedback signals to the main controller; and
a support motor for rotating the workpiece in response to support motor control signals from the main controller, such that the motions of the drive unit, the flyer motor, and the support motor may be synchronized according to schedules provided by the main controller.

39. A wire tensioner for maintaining wire at a substantially constant tension in a machine that winds wire around a workpiece, comprising:
a frame;
means mounted on the frame for receiving the wire from a wire supply;
a pulley wheel that engages the wire and accepts the wire from the means for receiving; and
a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals provided by a main controller in accordance with speed schedules that control speeds at which the pulley wheel rotates.

40. The wire tensioner of claim 39 further comprising:

a tension sensor mounted on the frame and in contact with the wire for measuring the tension of the wire and for providing corresponding tension feedback signals to the main controller.

41. The wire tensioner of claim 40 wherein the main controller contains means for calculating deviations between expected values of wire tension and the tension feedback signals, the main controller updating the speed schedules continually based on the deviations.

42. The wore tensioner of claim 40 wherein the main controller contains means for calculating deviations between expected values of wire tension and the tension feedback signals, the main controller updating the speed schedules periodically based on the deviations.

43. The wire tensioner of claim 39 wherein the means for receiving comprises a dancer arm assembly for pretensioning the wire.

44. The wire tensioner of claim 39 further comprising a resolver within the drive unit for supplying position signals.

45. The wire tensioner of claim 39 further comprising control means for receiving the position signals and for receiving command signals from the main controller, the control means providing drive signals to the drive unit.

46. The wire tensioner of claim 39 herein the control means comprises:
a control unit for receiving the command signals and for providing corresponding analog reference signals; and
a servoamplifier unit for receiving the position signals and the analog reference signals and for providing the drive signals accordingly.

47. The wire tensioner of claim 39 wherein the dancer arm assembly comprises:
a dancer arm pivotably attached to the frame;
a dancer arm pulley attached to the dancer arm for engaging the wire; and
a spring attached between the frame and the dancer arm for biasing the dancer arm such that the dancer arm pulley pretensions the wire.

48. The wire tensioner of claim 39 wherein the drive unit is connected to the pulley wheel by a shaft that is rotatably mounted on bearings that are supported within the frame.

49. The wire tensioner of claim 39 wherein the drive unit is a brushless motor.

50. The wire tensioner of claim 39 further comprising:
a flyer motor for driving a flyer for dispensing the wire during winding that is responsive to flyer control signals that are received from the main controller; and
a support motor for rotating the workpiece in response to support motor control signals from the main controller, such that the motions of the drive unit, the flyer motor, and the support motor may be synchronized according to schedules provided by the main controller.

51. The wire tensioner of claim 39 further comprising:
a flyer for dispensing the wire during winding; and
a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

52. The wire tensioner of claim 51 further comprising:
a support motor for rotating the workpiece in response to support motor control signals from the main controller, such that the motions of the drive unit, the flyer motor, and the support motor may be synchronized according to schedules provided by the main controller.

53. A wire tensioner for maintaining wire at a substantially constant tension in a machine that winds wire around a workpiece, comprising:
a frame;
means mounted on the frame for receiving the wire from a wire supply;
a pulley wheel that engages the wire and accepts the wire from the means for receiving;
a drive unit mounted on the frame and connected to the pulley wheel for rotating the pulley wheel in a first direction such that wire is fed toward the workpiece and a second direction such that wire is drawn back from the workpiece, the drive unit receiving and being responsive to drive signals provided by a main controller that control torques applied by the drive unit; and
a tension sensor mounted on the frame and in contact with the wire for measuring the tension of the wire and for providing corresponding tension feedback signals to the main controller.

54. The wire tensioner of claim 53 further comprising:
a flyer for dispensing the wire during winding; and
a flyer motor for driving the flyer, the flyer motor being responsive to flyer control signals that are received from the main controller, such that motion of the pulley wheel and motion of the flyer may be synchronized by simultaneously controlling the motion of the pulley wheel and the flyer with the main controller.

55. The wire tensioner of claim 54 further comprising:
a support motor for rotating the workpiece in response to support motor control signals from the main controller, such that the motions of the drive unit, the flyer motor, and the support motor may be synchronized according to schedules provided by the main controller.

* * * * *